United States Patent [19]

Lahner, III

[11] 4,395,047

[45] Jul. 26, 1983

[54] SHAFT SEAL WITH SEAL IMPELLER FOR MATERIALS PROCESSING MACHINERY

[75] Inventor: William F. Lahner, III, Lewisburg, Pa.

[73] Assignee: Koppers Company, Inc., Pittsburgh, Pa.

[21] Appl. No.: 347,645

[22] Filed: Feb. 10, 1982

[51] Int. Cl.$^3$ .............................................. F16J 15/42
[52] U.S. Cl. ......................................... 277/3; 277/13; 277/25; 277/68; 277/72 FM; 277/134
[58] Field of Search ...................... 277/1, 3, 13, 14 R, 277/14 V, 25, 67, 68, 69, 70, 71, 72 R, 72 FM, 74, 135, 133, 134

[56] References Cited

U.S. PATENT DOCUMENTS

| 845,701 | 2/1907 | Moore | 277/70 X |
|---|---|---|---|
| 1,677,119 | 7/1928 | Kinyon | 277/3 X |
| 1,720,696 | 7/1929 | Simpson | 277/13 |
| 1,997,613 | 4/1935 | Vroom | 277/134 X |
| 3,700,247 | 10/1972 | Butler et al. | 277/134 X |
| 4,345,988 | 8/1982 | Koch | 277/3 |

OTHER PUBLICATIONS

"Sprout-Waldron News", vol. 8, No. 4, Dec. 1980, Koppers Company, Inc., Muncy, Pennsylvania pp. 1 and 3.

Primary Examiner—Robert S. Ward, Jr.

Attorney, Agent, or Firm—Thomas L. Sivak; Herbert J. Zeh, Jr.

[57] ABSTRACT

Shaft sealing for a materials processing rotor at the juncture of the rotor's shaft with its surrounding machine housing. The sealing apparatus includes a seal stator carried on the machine housing and through which the shaft of the rotor extends. A seal impeller, having a plurality of elongated, oblique impeller vanes forming its perimeter, is carried on the rotor shaft within the seal stator. Fluid restraining means extends between the machine housing and the rotor shaft, at a location outboard of the seal impeller, to provide a fluid dam, and fluid injection means extends from the exterior of the machine housing to a position between the fluid restraining means and the seal impeller. In a preferred practice of the invention, a fluid, such as water, is continuously injected from the exterior of the machine to the position forward of the fluid restraining means and contemporaneously the seal impeller is rotated within the seal stator at a speed sufficient to induce a pressure less than or equal to the pressure at which the material is being processed, at a position immediately adjacent and forward of the fluid restraining means. After injection, the fluid is directed along a path, obliquely of the center line of the rotor shaft, through the space between the stator and the impeller and then expelled into the material being processed.

3 Claims, 6 Drawing Figures

SHAFT SEAL WITH SEAL IMPELLER FOR MATERIALS PROCESSING MACHINERY

BACKGROUND OF THE INVENTION

1. Field of the Invention

This invention relates to a shaft seal for materials processing machinery and, more specifically, to a pump or impeller type seal that is preferably fluid purged for use in attrition mills and the like, such as an atmospheric wood pulp refiner.

2. Description of the Prior Art

In the prior art and, in particular, in connection with atmospheric wood pulp refiners, many types of rotor shaft seals have been employed to inhibit ingress of the material being processed into the area or zone where the main shaft of the refiner passes through its surrounding, closely fitting, machine housing. Among main objects of such seals are the desiderata to prevent abrasion or erosion of the shaft and/or housing at such zones by the natural or inherent abrasive property of certain processed materials, as well as to prevent such materials from damaging shaft bearings or journals that are frequently located adjacent to the juncture of the main shaft with the machine housing.

In one of the best of the known prior art refiner seals, as employed by applicant's assignee, a mechanical seal is used in conjunction with a lip seal and a cone shaped, centrifugal type, fluid impeller. This system provides a very effective seal that is particularly useful for pressurized refiners. However, the mechanical seals are very costly and the lip seals require replacement periodically. Changing a lip seal necessitates shutting down the machine for 10 to 12 hours. Moreover, optimum operation of the cone shaped, centrifugal type, fluid impeller can be adversely affected by excessive movement of the main shaft due to thermal expansion and end play. Also, the cone shaped, centrifugal type impeller, notwithstanding fluid injection, is found to be inherently susceptible to permitting some processed materials to pass thereover or therepast and cause abrasive damage to the main shaft and/or surrounding housing, as well as adjacent main shaft bearing structures. In addition, while pressurized refiners require an exotic system of seals to maintain desired pressure during refining, such is not the case with atmospheric refiners due to their reduced operating pressure.

BRIEF SUMMARY OF THE INVENTION

In accordance with the present invention, improved shaft sealing is provided for materials processing machinery of the type heretofore described so as to prevent ingress of the material being processed either into or through the juncture of the main shaft or rotor shaft of the machine with its surrounding machine housing. In one preferred embodiment of the invention, the sealing apparatus includes a cylindrical, seal stator carried on the machine housing and through which the shaft of the rotor extends. A cylindrical, seal impeller, having a plurality of elongated, oblique impeller vanes forming its perimeter, is carried on the rotor shaft within the seal stator. Fluid restraining means extends between the machine housing and the rotor shaft, at a location outboard of the seal impeller, to provide a fluid dam, and fluid injection means extends from the exterior of the machine housing to a position between the fluid restraining means and the seal impeller.

In its preferred mode of operation on atmospheric refiners or the like, a fluid, such as water, is continuously injected from the exterior of the machine to the position forward of the fluid restraining means and contemporaneously the seal impeller is rotated within the seal stator at a speed sufficient to induce a pressure less than or equal to the pressure at which the material is being processed, at a position immediately forward of the fluid restraining means. After injection, the fluid is directed along an axial path, obliquely of the center line of the rotor shaft, through the annular space between the stator and the impeller and then expelled into the material being processed.

DESCRIPTION OF THE PREFERRED EMBODIMENT

Figure 1:
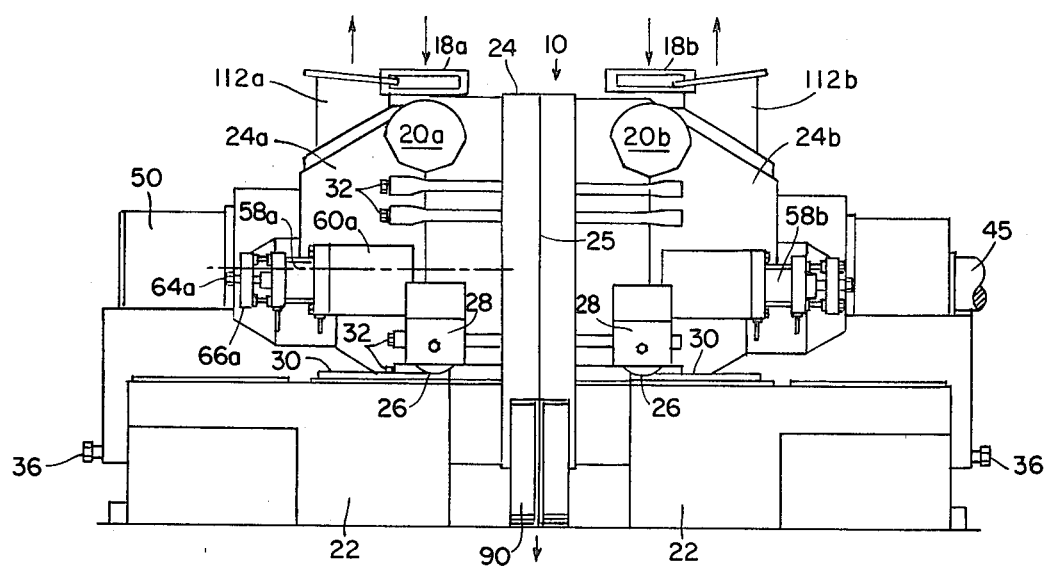
FIG. 1 is a schematic side elevation of typical materials processing machinery; i.e., a disc type refiner, for which the present invention is particularly well adapted.
Figure 2:
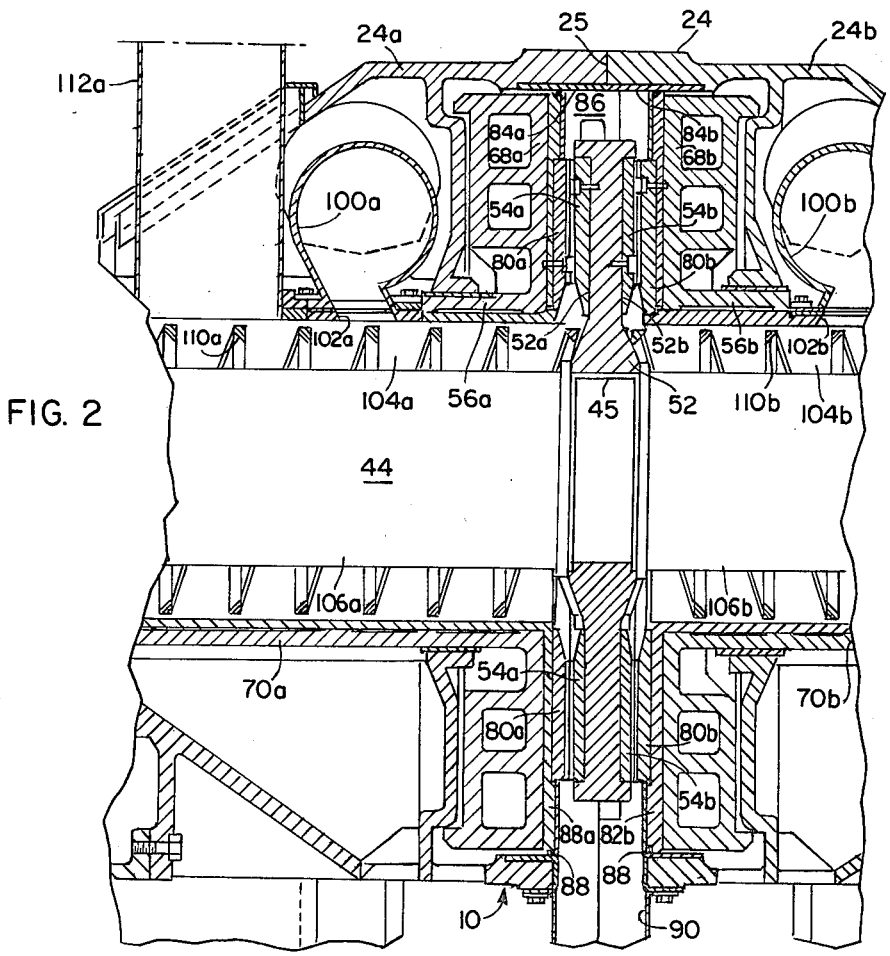
FIG. 2 is a partial, enlarged section view of the refiner of FIG. 1 showing interior refiner details.
Figure 3:
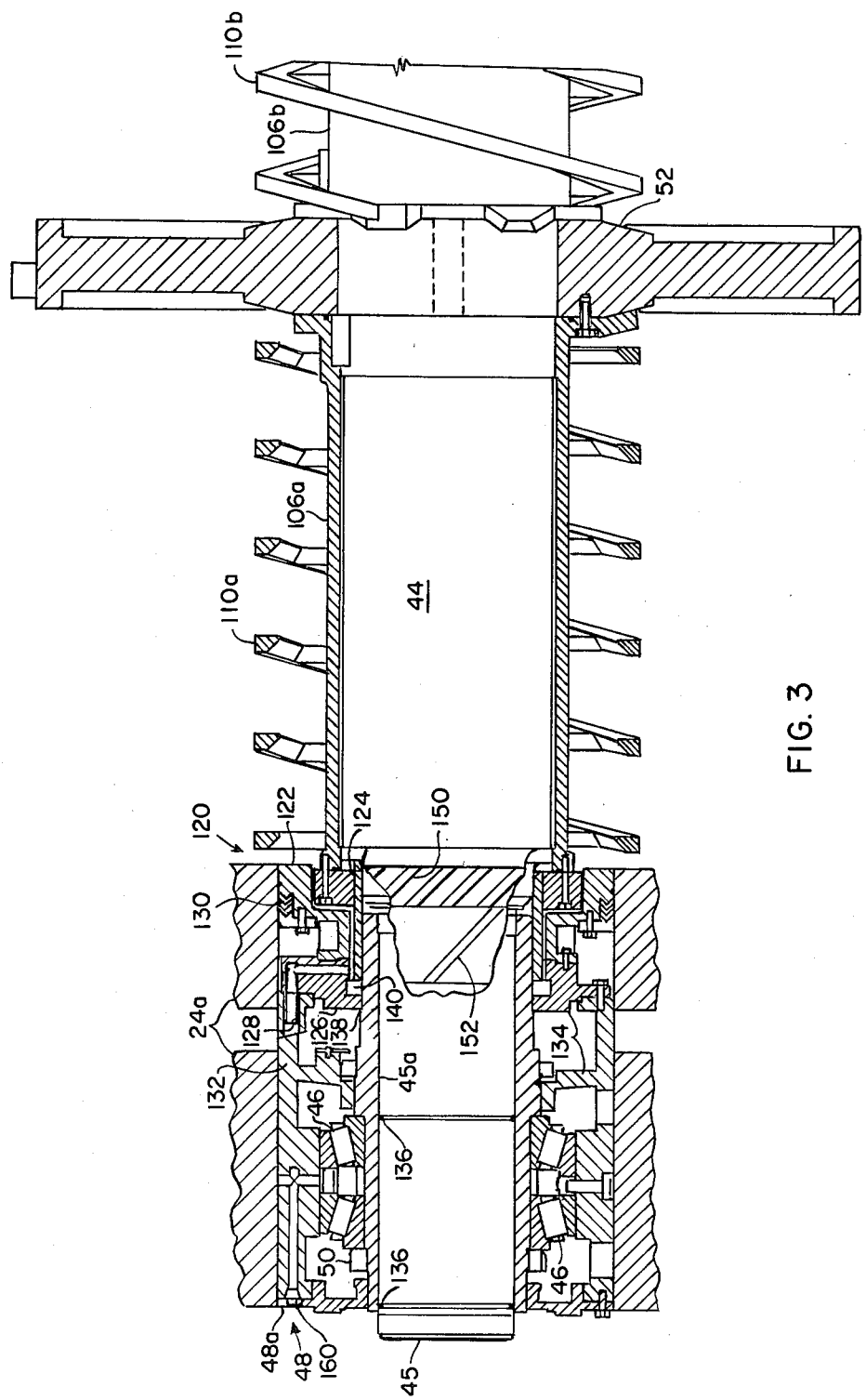
FIG. 3 is a partial, longitudinal section view of a refiner rotor, as shown in FIG. 2, including a preferred shaft seal of this invention and a bearing assembly mounted on the end of the rotor shaft.
Figure 4:
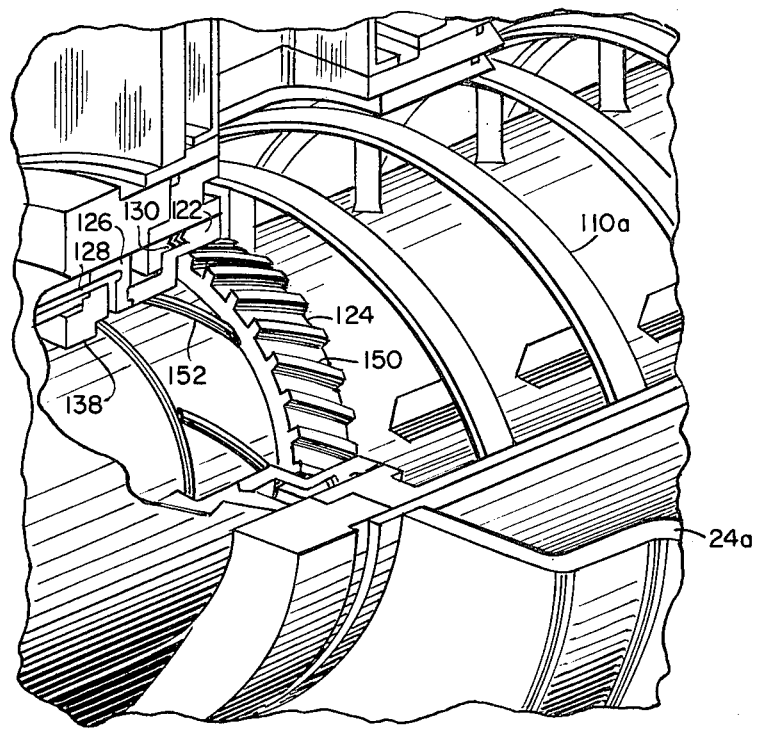
FIG. 4 is a partial, partly broken away, pictorial perspective of a refiner, such as shown in FIGS. 1 and 2, further illustrating a preferred shaft seal of this invention.

Referring to the drawings and, in particular, to FIG. 1, there is shown schematically, as one example of typical materials processing machinery contemplated by this invention, a disc type refiner, generally designated 10. The stock to be refined, which might typically comprise a water slurry of low bulk density wood fibers or either low consistency (high water content) or high consistency (low water content) wood chips, is fed through conduits 18a and 18b into infeed conveyors 20a and 20b, respectively, of the refiner. Further details of the refiner 10 are shown in FIGS. 2 to 4.

As shown, a refiner base 22 supports a machine housing or casing 24 formed by casing sections 24a and 24b which are separable along vertical interface 25. Grooved wheels 26, journaled in members 28 extending from each side of the casing sections, movably support the section on parallel rails 30 on the base 22. The casting sections are secured together during operation of the refiner by a plurality of bolts 32 spaced along the sides of the sections perpendicular to and spanning the interface 25 therebetween. The casing sections are readily separable to change the refiner plates or for other servicing of the unit by opening the bolts 32 and by rotation of a positioning screw 36 at the bottom of the outer end of each casing section. The rotation of each screw 36 will move its casing section on the tracks 30 along the longitudinal axis of the refiner.

A rotor 44 passes centrally through the casing and includes a rotor shaft 45 which is supported by bearings at the outer end of each casing section. As shown in FIG. 3, the tail end of the rotor shaft is journaled in casing 24a by bearings 46 which are mounted in a bearing support member or bearing housing 48 and secured therewithin by a clamping ring 50. Member 48 is disposed within its casing section to permit axial displacement of the casing section without changing the position of either the bearing support member 48 or the rotor with respect to the base. The drive end of the rotor shaft extends through the casing section 24b, as shown in FIG. 1, and is journaled within the casing section in a manner substantially identical to that shown in FIG. 3. Bearings 46 are tapered bearings and, although primarily employed as radial bearings, they will accommodate some thrust. A refiner motor (not shown) is connected to the extending rotor shaft and for large size refiners, may be as large as upwards of 15,000 horsepower. For all size refiners of the type shown, a rotor speed of about 1500 to 1800 R.P.M. is normally used.

A radially extending rotor disc 52 is centrally mounted on the rotor shaft within the casing and is keyed to the shaft for rotation therewith. Sets of refining plates 54a and 54b, of conventional construction, are bolted to the opposite faces 52a and 52b of the disc 52. Disposed within the respective casing sections 24a and 24b and axially juxtaposed the faces 52a and 52b of the rotor disc are the non-rotating heads 56a and 56b which are axially slidable within the casing sections. The non-rotating heads are each respectively connected to a pair of diametrically opposed hydraulic piston-cylinder assemblies 58a and 58b (FIG. 1) which, among other things, control the axial position of the heads and provide the attrition force required during refining.

As shown in FIG. 2, the non-rotating heads 56a and 56b, respectively, include radially extending plate support portions 68a and 68b and cylindrical portions 70a and 70b coaxial with the longitudinal axis of the refiner. Cylindrical bearing elements and seal rings support the cylindrical portions 70a and 70b of the non-rotating movable heads in axially slidable sealed relation to the respective adjacent casing section surfaces. Refiner plates 80a and 80b are bolted to the radial faces of the non-rotating heads in respectively juxtaposed relation to the plates 54a and 54b of the rotor 52. Thus, two pairs of refiner plate assemblies arranged in tandem are provided. Ring shaped, radially disposed elements 82a and 82b, extending from between head portions 68 and the plates 80, seal the non-rotating heads against cylindrical elements 84a and 84b secured to the casing sections and form an annular chamber 86 between the non-rotating heads and circumferentially of the rotor, into which the refined products are discharged. Seal rings 88 between the members 82a and 82b and the plates 84 permit sliding movement of the heads with respect to the casing, while maintaining the sealed condition of the annular chamber 86. A discharge chute 90, at the bottom of the refiner, communicates with the annular chamber 86 for removal of the refined products from the machine.

The stock infeed to the refiner, as indicated above, is monitored by the infeed conveyors 20a and 20b. Conveyor screws (not shown), are respectively mounted in the infeed conveyor housings and driven by feed motors which are connected to the feed screws by variable speed drive units. The infeed stock passes from the infeed conveyors through the internal conduits 100a and 100b and exits through inclined openings 102a and 102b, in the bottom thereof, into the annular stock feed passages 104a and 104b coaxial with the rotor shaft.

Sleeves 106a and 106b, mounted on the rotor shaft and bolted to each side of the rotor disc, support ribbon type screw conveyor elements 110a and 110b within the chambers 104a and 104b, respectively. The ribbon conveyor screws 110a and 110b have opposite pitch angles selected so that rotation of the rotor will advance infeed stock from the conduits 100a and 100b toward the rotor disc and into the throat regions of the refining plates. Similarly, the infeed conveyor screws are of opposite pitch angles, the one screw being rotated counterclockwise and the other screw being rotated clockwise, as viewed in FIGS. 1 and 2, so that the feed stock will be thrown by the screws toward the rotor disc, through the inclined openings 102a and 102b.

The ribbon screws 110a and 110b are utilized to permit steam generated during the refining of the stock to escape along the tubes 106a and 106b into the steam discharge spouts 112a and 112b at the ends of the casing sections. A novel seal assembly of this invention, only one of which is shown at 120, is provided at each end of the ribbon screw conveyors 110a and 110b to prevent steam and stock particles from passing to the shaft area and bearing region of the rotor.

The mechanical operation of the refiner should to a large extent be obvious from the above discussion of the refiner structures and will be summarized prior to considering the details of the novel shaft seal system of the present invention. With the rotor driven at a predetermined speed, generally about 1500 to 1800 R.P.M., by the refiner motor, the stock to be refined is fed from a bin or the like by suitable feeders into infeed conveyors 20a and 20b. Feed motors drive the infeed conveyors at a predetermined rate of speed. The stock passing the infeed conveyors is advanced by the ribbon conveyors 110a and 110b into the throat of the refining plates on each side of the disc and is centrifugally passed between opposite sets of refining plates 54a, 80a and 54b, 80b. The close spacing of the plates, which may be only a few thousandths of an inch, causes fiberization of the stock and, in the process, can generate a considerable amount of steam which escapes axially back through the ribbon conveyor and out through the steam discharge spouts 112a and 112b. The refined stock passes from the refiner through the discharge conduit 90.

With reference, in particular, to FIGS. 3 and 4, a preferred shaft seal assembly 120 of this invention is disclosed in detail. Shaft seal assembly 120 essentially comprises an axial pump, including a cylindrical stator 122 secured to the machine housing or casing and a cylindrical impeller 124 carried on the rotor shaft within the stator 122. Also, as part of the assembly 120, are included a fluid restraining ring or dam 126 extending between the casing and the rotor shaft at a position outboard of the seal impeller, and a fluid injection conduit 128 extending from the exterior of the machine casing, as by a suitable bore, to a position forward of the fluid restraining dam 126 and aft of the inboard extremity of the seal impeller 124.

Stator 122 is a stationary or non-rotatable ring secured to casing section 24a forward or inboard of bearing housing 48. As shown, a chevron seal ring assembly 130 is affixed to the stator ring 122 at its outer perimeter to provide sealing engagement against the surrounding casing section 24a and to prevent the possible ingress of stock between the casing section and chevron seal 130. As will be noted, the outer circumference of the chevron seal ring and the stator ring are both the same or substantially the same as the outer circumference of bearing housing 48. As will become more apparent, this outer circumferential parity has to do with providing a convenient combination bearing and seal cartridge assembly that can be installed in or removed from refiner 10 as a unit, as well as to permit the aforesaid axial displacement of the adjacent casing section.

As shown, interposed between stator 122 and bearing housing 48 and interconnected, as by bolts, with the stator and an extension 132 of the outer cylindrical housing portion 48a for the outer race of the bearing is stationary fluid restraining ring or dam 126. Fluid restraining ring 126 is shown having an outer circumference slightly less than that of its adjacent stator and outer bearing housing portion, in order to conveniently reduce the frictional interaction between the assembled combination bearing and seal cartridge 134 and the surrounding casing during assembly or removal of the cartridge.

As aforesaid, fluid restraining ring 126 extends between the casing and the rotor shaft 45 or, more accurately in the embodiment shown, a coaxial sleeve 45a frictionally secured to the shaft by a light press fit and sealed by O-rings 136. This shaft sleeve 45a also comprises an inner cylindrical housing portion for the inner race of the bearing. Fluid restraining ring 126 presents a cylindrical face to the adjacent cylindrical sleeve of the shaft 45 but, for reasons that will become more apparent hereinafter, is slightly spaced therefrom, such as about 0.025 inch, so that an annular passage 138 of a predetermined dimension exists between the fluid restraining ring 128 and the shaft sleeve.

It is to be understood that, in operation, the shaft sleeve 45a functions in all respects as an integral part of the shaft 45 but is advantageously separably integrated with the main shaft body, as herein described, so that it can be made of a material that is harder and more abrasive- and corrosive-resistant, for example, than the preferred milder steels of which shafts are commonly manufactured. Accordingly, as used herein, the term "shaft" is obviously intended to encompass, unless otherwise indicated, the mentioned shaft sleeve 45a as an integral part of the shaft 45. The bolted together stator, fluid restraining ring and outer bearing housing are conveniently held stationary with respect to the machine casing by the combination of a casing end ring and a stator end cap (for casing section 24a) or a stator ring member (for casing section 24b), not shown, removably secured together and respectively secured to the end of the casing and the adjacent end of the outer bearing housing, as by bolts.

Further, in the embodiment shown, an L-shaped, annular pump or impeller cavity 140, as viewed in section, is formed between the fluid restraining ring 126 and stator 122, to its outer side, and the shaft and/or shaft sleeve 45, 45a, to its inner side. Residing in this cavity 140 is the complementary shaped ring impeller 124 that, for convenience of manufacture, is made of two coaxial rings integrated together as by welding. The ring impeller 124 is supported on the adjacent shaft and/or shaft sleeve portion and is secured for rotation therewith by being bolted to the outer end of the adjacent ribbon conveyor sleeve 106a which, as aforesaid, is secured for rotation with the shaft by being bolted at its other end to the rotor disc 52. Obviously, a radial or annular clearance is provided between the impeller and its outer cavity forming members (about 0.030 inch in the embodiment shown) to permit for rotation and, as shown, there is also provided a longitudinal clearance therebetween to accommodate thermal expansion and end play, as well as to provide a slightly increased cavity space or reservoir adjacent the fluid restraining ring.

Formed on the perimeter of the main body portion or short leg of the L-shaped ring impeller 124 (as shown) are a plurality of elongated, oblique impeller vanes 150 spaced evenly therearound. Typically, in the embodiment shown, twenty-four such vanes, about ⅜" wide by ¼" deep, are employed disposed at an angle of 45 degrees, with the interior directed ends of the vanes lagging the exterior directed ends of the vanes in the direction of rotation of the shaft; i.e., counterclockwise as viewed from the left side in FIG. 3. Similarly, formed on the perimeter of the initial body portion or the long leg of the L-shaped ring impeller are a plurality of elongated, complementarily oblique vanes 152, hereinafter called flinger vanes, spaced evenly therearound. The impeller vanes 150, as shown, are located coaxial with and radially outward of the flinger vanes 152. In the embodiment shown, four such flinger vanes, about ½" wide by ¼" deep, are employed disposed at an angle of 45 degrees and spaced 90 degrees apart. The purpose of these initial flinger vanes, as will shortly be apparent, is to initiate and maintain rotation of a purge fluid that is to be ultimately pumped by the main portion of the impeller into the stock being processed, as well as to impart initial kinetic energy to the purge fluid.

Finally, for introduction or injection of a purge fluid, e.g., water, into the impeller chamber, there is shown a cylindrical conduit or bore 128 extending from a convenient point (not shown) at the exterior of the machine casing to the pump cavity at a position forward of the fluid restraining ring and aft or at the free end of the flinger portion of the impeller 124. Also shown in FIG. 3 is an oil conduit 160 leading from the exterior of the machine casing to the bearings 46 for the purpose of oil flooding the bearings.

The operation of the shaft seal of this invention proceeds in the following manner. A fluid, such as water, is injected from the exterior of the machine housing at a rate of about 1.5 to 2 g.p.m. to the pump cavity at a position forward of the fluid-restraining ring or dam. Contemporaneously the rotor and seal impeller are rotated at a speed sufficient to induce a pressure less than or equal to the pressure at which the material is being process, at a position immediately adjacent and forward of the fluid retraining ring, so that the injected water does not flow outwardly past the fluid restraining ring at its designed clearance with the rotor shaft. For the impeller described, a speed of about 1500 to 1800 R.P.M. was found to be adequate for this purpose. Initial kinetic energy and rotation are imparted to the purging fluid by the rotating flinger vanes. Thence the purging fluid is directed along an axial path, obliquely of the center line of the rotor shaft, through the annular passage between the stator and the impeller. The resultant wetting of the stator and impeller portions, defining this annular passage, as well as the outwardly directed flow of fluid therethrough, inhibits both steam and the stock being refined from passing through this passage and, also, the stock from adhering to the passage walls. Moreover, the stock or material within the refiner casing attempting to enter into this annular space or passage is confronted by the angularly or obliquely disposed impeller vanes in a direction resisting entry of the material into this space. Finally, of course, the purging fluid is expelled into the material being processed.

A model of the above described shaft seal was constructed and tested. Following are the results of that test employing the operating parameters outlined above.

Leakage Rate at Fluid Dam: 0
Wear at Fluid Dam: 0
Air Flow: 10 C.F.M.
Maximum Static Pressure: 0.68" H$_2$O
Velocity at Impeller: 4900 F.P.M.
Degrees of Water Coverage at Impeller Exit: 360°

Figure 5:
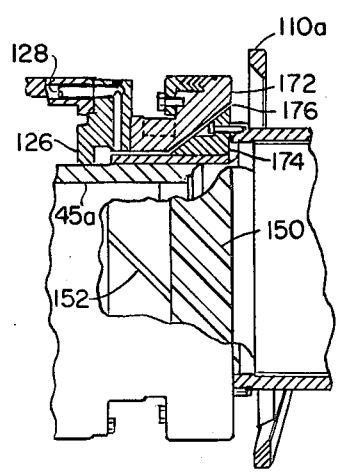
FIG. 5 is a partial, longitudinal section view of a refiner rotor, as shown in FIG. 3, illustrating an alternative shaft seal of this invention.
Figure 6:
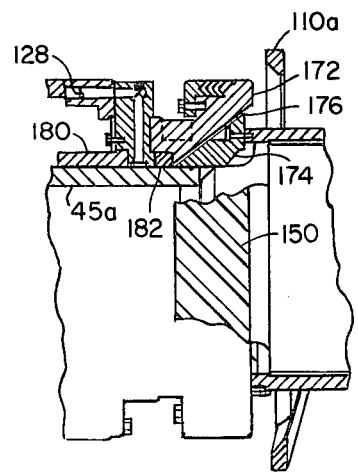
FIG. 6 is also a partial, longitudinal section view of a refiner rotor, as shown in FIG. 3, illustrating a further alternative shaft seal of the invention.

Shown in FIGS. 5 and 6 are two useful alternative shaft seal constructions employing the principles of this invention. Accordingly, like numerals to those employed in FIG. 3 are used to identify like parts in these figures. With reference to FIG. 5, then, the primary difference from FIG. 3 is the shape of the stator 172 and the main body of the impeller 174. In FIG. 5 these ring members are interfitting, matching conical members to provide a radially divergent passage or space 176 along which the purging fluid is directed. In other respects the construction of FIG. 5 is substantially identical with that of FIG. 3. In FIG. 6, on the other hand, the conical stator and impeller arrangement of FIG. 5 is again repeated but without the flinger ring, as employed in FIGS. 3 and 5. Also, for purposes of permitting elevated pressurization of the refiner, a mechanical seal 180 and lip seal 182, of conventional construction, are schematically shown in place of the fluid restraining ring of FIGS. 3 and 5. Obviously, moreover, such an expedient of employing a pressure resistant seal, in lieu of a fluid restraining ring or dam, could also be employed in the embodiment of FIG. 3, if desired, for higher pressure operation of the refiner.

Accordingly, although the present invention has been shown and described in detail in connection with a particular embodiment thereof, it will be understood that it may otherwise be embodied within the scope of the following claims.

What is claimed:

1. A shaft seal assembly for materials processing machinery of a type in which the material is fed into a machine housing containing a materials processing rotor and the material is therein processed and subsequently discharged therefrom at substantially atmospheric pressure, said seal assembly comprising,:
    a cylindrical seal stator carried on said housing and through which the shaft of said rotor extends,
    a cylindrical seal impeller carried on said shaft within said seal stator, said cylindrical seal impeller comprised of an initial body portion adjacent fluid restraining means, and a main body portion terminating in direct proximity with the interior of said machine housing, said fluid restraining means extending between said housing and said rotor shaft at a location outboard of said seal impeller, and said fluid restraining means comprised of a ring member extending to within close proximity of said rotor shaft, but spaced therefrom,
    a plurality of elongated, oblique, impeller vanes forming the perimeter of said seal impeller, said impeller vanes on said main body portion located coaxial with and radially outward of the impeller vanes on said initial body portions; and
    fluid injection means extending from the exterior of said machine housing to a position forward of said fluid restraining means and aft of the inboard extremity of said seal impeller.

2. A shaft seal assembly for materials processing machinery of a type in which the material is fed into a machine housing containing a materials processing rotor and the material is therein processed and subsequently discharged therefrom, said seal assembly comprising:
    a cyclindrical, seal stator carried on said housing and through which the shaft of said rotor extends,
    a cylindrical seal impeller carried on said shaft within said seal stator, and cylindrical seal impeller comprised of an initial body portion adjacent fluid restraining means, and a main body portion terminating in direct proximity with the interior of said machine housing, said fluid restraining means extending between said housing and said rotor shaft at a location outboard of said seal impeller, and said fluid restraining means comprised of a ring member extending to within close proximity of said rotor shaft, but spaced therefrom,
    a plurality of elongated, oblique, impeller vanes forming the perimeter of said seal impeller, said impeller vanes on said main body portion located coaxial with and radially outward of the impeller vanes on said initial body portions and
    fluid injection means extending from the exterior of said machine housing to a position forward of said fluid restraining means and aft of the inboard extremity of said seal impeller.

3. A shaft seal assembly as in claim 2 wherein said fluid restraining means is constructed and arranged to provide a pressure resistant seal at said rotor shaft.

* * * * *